United States Patent [19]
Vitruk

[11] Patent Number: 5,822,354
[45] Date of Patent: Oct. 13, 1998

[54] VARIABLE-APERTURE CAVITY LASER

[75] Inventor: Peter Vitruk, Bothell, Wash.

[73] Assignee: Synrad, Inc., Bothell, Wash.

[21] Appl. No.: 636,039

[22] Filed: Apr. 22, 1996

[51] Int. Cl.[6] .................................................. H01S 3/08
[52] U.S. Cl. .............................. 372/92; 372/95; 372/97; 372/64; 372/103
[58] Field of Search .............................. 372/99, 92, 64, 372/95, 97, 103

[56] References Cited

U.S. PATENT DOCUMENTS

| | | | |
|---|---|---|---|
| 4,169,251 | 9/1979 | Laakmann | 331/94.5 G |
| 4,433,418 | 2/1984 | Smith | 372/95 |
| 4,719,639 | 1/1988 | Tulip | 372/66 |
| 4,805,182 | 2/1989 | Laakmann | 372/82 |
| 4,939,738 | 7/1990 | Opower | 372/95 |
| 5,048,048 | 9/1991 | Nishimae et al. | 372/95 |
| 5,058,122 | 10/1991 | Gekat | 372/82 |
| 5,097,479 | 3/1992 | Opower | 372/95 |
| 5,123,028 | 6/1992 | Hobart et al. | 372/95 |
| 5,125,001 | 6/1992 | Yagi et al. | 372/95 |
| 5,189,681 | 2/1993 | Blaszuk | 372/95 |
| 5,199,042 | 3/1993 | Papetti et al. | 372/95 |
| 5,210,768 | 5/1993 | Seguin | 372/92 |
| 5,216,689 | 6/1993 | Gardner et al. | 372/87 |
| 5,220,577 | 6/1993 | Opower | 372/92 |
| 5,283,797 | 2/1994 | Mefferd | 372/64 |
| 5,335,242 | 8/1994 | Hobart et al. | 372/95 |
| 5,392,308 | 2/1995 | Welch et al. | 372/92 |
| 5,392,309 | 2/1995 | Nishimae et al. | 372/5 |
| 5,412,681 | 5/1995 | Eisel et al. | 372/95 |
| 5,537,432 | 7/1996 | Mehuys et al. | 372/99 |
| 5,592,503 | 1/1997 | Welch et al. | 372/97 |

OTHER PUBLICATIONS

Siegman, *Lasers*, University Science Books, Mill Valley, CA, 1986, pp. 903–904.

Gabai et al., "Radio–frequency excited stripline CO and $CO_2$ lasers," Paper TUB4 presented at *Conference on Lasers and Electro–Optics*, Jun., 1984.

Vitruk and Yatsenko, *Slab lasers with RF excitation*, Preprint N 402, Institute of Problems in Mechanics, USSR Academy of Sciences, Moscow, Russia, 1989, pp. 1–22 (in Russian w/translation into English).

Vitruk et al., "Similarity and scaling in diffusion–cooled RF–excited carbon dioxide lasers," *IEEE J. Quantum Electrons*, vol. QE–30, N7, 1994, pp. 1623–1634.

*Primary Examiner*—Leon Scott, Jr.
*Attorney, Agent, or Firm*—Seed and Berry LLP

[57] ABSTRACT

A diffusion-cooled laser has a lasing region shaped to provide a high power output laser beam of a high optical quality. The lasing region, which contains a lasing medium, has a narrow-aperture section and a free-space section. The narrow-aperture section is defined by resonator walls spaced apart a sufficiently small distance that enables effective excitation and cooling of the lasing medium. The free-space section is defined by resonator walls spaced apart a sufficiently larger distance that enables the laser beam to expand without restriction from the resonator walls in the free-space section. The narrow-aperture section enables the laser to generate a high power laser beam using a relatively low (40 MHz) ISM frequency. The free-space section allows the laser beam to expand sufficiently to exit the lasing region with a shape that is easily focused by inexpensive optical elements.

29 Claims, 5 Drawing Sheets

VARIABLE-APERTURE CAVITY LASER

TECHNICAL FIELD

The present invention relates to lasers and, more particularly, to diffusion-cooled lasers with lasing regions designed to maximize power, minimize laser beam divergence, and minimize cost.

BACKGROUND OF THE INVENTION

The most powerful and efficient operation of diffusion-cooled lasers can be achieved when the lasing medium geometry is such that at least one of its spatial dimensions (typically it is transverse to the optical axis) is small so this narrow lasing medium can be very efficiently excited and cooled. Important practical examples of diffusion-cooled lasers include radio frequency (RF) excited gas lasers and also optically pumped solid-state lasers in which the lasing medium is cooled by the heat conduction through the active lasing medium toward its externally cooled boundaries.

An RF-excited laser produces laser energy when a lasing medium within an elongated laser lasing region is excited by a radio frequency voltage between a pair of externally cooled electrodes. The basic transverse RF gas laser was first disclosed in U.S. Pat. No. 4,169,251 to Katherine D. Laakmann ("the '251 patent"). That patent describes the laser lasing region as being enclosed in an elongated waveguide having two walls that are dielectrics and two walls that are the electrodes across which the RF voltage is applied.

The basic RF-excited laser evolved into high power slab gas lasers as disclosed in "Radio-Frequency Excited Stripline CO and $CO_2$ Lasers," Gabai et al., Paper TUB4 presented at Conference on Lasers and Electro-Optics, June 1984 and U.S. Pat. No. 4,719,639 to Tulip. Such high power slab lasers enable the large volume lasing medium to be efficiently excited by an RF voltage and the resulting gas discharge and cooled by thermal conductivity through the gas to large surface area slab electrodes. An example of such a prior art slab laser 10 is shown in FIG. 1. The slab laser 10 includes first and second elongated, planar slab electrodes 12, 14 parallel to each other and extending between first and second resonator mirrors 16, 18. A gas lasing medium is positioned within a lasing region 20 formed between the slab electrodes 12, 14 and the resonator mirrors 16, 18. When the RF voltage is applied to the gas lasing medium via the slab electrodes 12, 14, a gas discharge is formed between the electrodes and the resonator mirrors 16, 18 form a laser beam 22 from the gas discharge within the lasing region 20. In the laser 10 shown in FIG. 1, the resonator mirrors 16, 18 form an unstable resonator with an exit aperture 24 such that the laser beam 22 travels laterally until the laser beam exits the lasing region 20 via the exit aperture. The slab electrodes 12, 14 are positioned sufficiently close to each other (e.g., 2 millimeters) to also act as a waveguide to prevent the laser beam from expanding transverse to the faces of the electrodes.

The typical prior art slab laser 10 shown in FIG. 1 provides a high power laser beam of a reasonable laser beam quality, but has several drawbacks. First, the rectangular exit aperture 24 is of high aspect ratio (i.e., length vs. width) which produces an output laser beam 22 that is unacceptable for most of the applications that employ spherical lenses to handle the laser beam. Second, the rectangular output laser beam 22 suffers from a high density optical flux which makes the laser beam more difficult to handle. As a result, very expensive optics must be employed to reshape the laser beam into a square or circular shape.

Third, the narrow gap between the electrodes requires that the RF frequency used to excite the lasing medium be very high (e.g., 80 MHz and above) which is non-ISM standard. Such high non-ISM excitation frequencies require that specialized and relatively expensive drive systems be used to produce the longitudinally uniform discharge excitation voltage. The necessity of using such high frequencies with a narrow gap between the electrodes is explained in more detail in the '251 patent, which is incorporated by reference herein. A more detailed discussion of the frequency and interelectrode gap-dependent RF discharge properties and non-uniformities can be found in Vitruk et al, "Similarity and Scaling in Diffusion-Cooled RF Excited Carbon Dioxide Lasers," IEEE J. Quantum Electron., QE-30, N7, pp. 1623–34 (1994), which is incorporated herein by reference.

As shown in FIG. 1, a laser beam 22 produced by the prior art slab laser 10 exits the lasing region 20 via the exit aperture 24. The transmission of the laser beam 22 toward and out of the exit aperture 24 can be accomplished using a positive-branch, confocal unstable resonator 26 as shown in FIG. 2. The resonator mirrors 16, 18 of the resonator 26 are confocal and curved to reflect the laser beam 22 back and forth and toward the exit aperture 24.

An alternate prior art variable-aperture laser 28 is shown in FIG. 3 and is disclosed in U.S. Pat. No. 5,220,577 to Opower ("the '577 patent"), which is incorporated herein by reference. Rather than using curved confocal resonator mirrors 16, 18 like the resonator 26 shown in FIG. 2, the laser 28 shown in FIG. 3 employs first and second flat resonator mirrors 30, 32 with an exit aperture 34 is formed in one end of the second resonator mirror 32. The exit aperture 34 is formed by making the exit aperture portion of the second resonator mirror 32 only partially reflective (e.g., 90% reflective). In order to cause a laser beam 36 to travel toward the exit aperture 34, the laser 28 uses slab electrodes 38, 40 positioned to diverge slightly. As shown in FIG. 4, the divergent slab electrodes 38, 40 waveguide the laser beam 36 toward the exit aperture 34 by reflecting the laser beam along its entire path to the exit aperture.

The variable-aperture laser 28 shown in FIGS. 3 and 4, fails to overcome any of the disadvantages discussed above for the variable-aperture laser 10 shown in FIGS. 1 and 2. The slab electrodes 38, 40 diverge so slightly that the exit aperture 34, and thus the output laser beam 36, still are substantially rectangular with high aspect ratios. Indeed, the '577 patent reports that the slab electrodes 38, 40 are separated by a gap of from 1.5 mm at their closest point to 2 mm at their farthest separation. A 2 mm gap combined with a typical aperture length of 5–6 mm gives the exit aperture 34 substantially the same rectangular, high aspect ratio shape as the exit aperture 24 shown in FIG. 1. As a result, the prior art variable-aperture laser 28 shown in FIGS. 3 and 4 suffers from the same disadvantages discussed above for the prior art variable-aperture laser 10 shown in FIGS. 1 and 2.

SUMMARY OF THE INVENTION

The invention is directed to a laser that includes a variable-aperture lasing region for formation of a laser beam of high optical quality. The lasing region is defined by a pair of resonator walls spaced apart from each other in a first direction and by a pair of resonator mirrors spaced apart from each other in a second direction perpendicular to the first direction. Each of the resonator walls has a narrow-aperture wall portion and a free-space wall portion. A narrow-aperture section of the lasing region is formed by the narrow-aperture wall portions of the resonator walls which are spaced apart by a first distance small enough to enable the effective excitation and diffusion cooling of a lasing medium positioned within the lasing region. The free-space wall portions of the resonator walls are spaced apart by a second distance large enough to enable the laser beam to expand without restriction from the free-space wall portions and thereby form a free-space section of the lasing region. The second distance is larger than the first distance, but still is small enough to enable effective excitation and diffusion cooling of the lasing medium. The laser beam exits the lasing region at an exit aperture in the free-space section.

The lasing medium positioned within the lasing region forms laser energy when excited by excitation energy from an energy source. The lasing medium can be solid, liquid, or gas. The pair of resonator mirror surfaces located at opposite ends of the lasing region are configured to form the laser energy into the laser beam. The laser beam is reflected back and forth between the resonator mirror surfaces in the second direction perpendicular to the first direction. The resonator mirror surfaces also are configured to reflect the laser beam in a manner that causes the laser beam to travel in a third direction transverse to the first and second directions. The laser beam travels in the third direction from a resonator axis in the narrow-aperture section of the lasing region to the free-space section and then exits the lasing region from the exit aperture in the free-space section.

In a preferred embodiment, the laser resonator mirror surfaces are confocal with respect to each other and are positioned to form an unstable resonator. Such an unstable resonator causes the laser beam to travel in the third direction from the resonator axis in the narrow-aperture section to the free-space section in order to exit via the exit aperture. Preferably the unstable resonator is a negative branch, confocal, unstable resonator in which each of the resonator mirror surfaces is concave.

In one embodiment, the lasing medium is a gas, such as a mixture of $CO_2$, $N_2$ and He and the resonator walls are electrodes through which the excitation energy is delivered to the lasing medium. In an alternative embodiment, the lasing medium is a solid-state slab, such as Nd:YAG, and the resonator walls are opposite surfaces of the solid-state slab of variable thickness. In such an embodiment, the solid-state lasing medium preferably is excited by radiant energy from flashlamps, laser diodes, or other sources of light.

DETAILED DESCRIPTION OF THE INVENTION

The present invention is directed to a diffusion-cooled laser having a lasing region shaped to provide a high power output laser beam of a high optical quality. The laser lasing region has a narrow-aperture section and a free-space section. The narrow-aperture section is defined by resonator walls spaced apart a sufficiently small distance to enable effective excitation and diffusion cooling of a lasing medium. In one embodiment, the resonator walls in the narrow-aperture section are spaced apart a sufficiently small distance in the narrow-aperture section to enable the resonator walls to waveguide the laser beam formed in the narrow-aperture section by restricting the expansion of the laser beam. In another embodiment, the narrow-aperture section includes a gap between the resonator walls that is large enough to prevent the resonator walls from waveguiding the laser beam. The free-space section is defined by resonator walls spaced apart a larger distance that is sufficient to enable the laser beam to expand without restriction from the resonator walls in the free-space section. The distance between the resonator walls in a free-space section still is small enough to allow for effective excitation and cooling of the lasing medium. High gain and high saturation intensity in the narrow-aperture section enable the laser to generate a high power laser beam while the free-space section allows the laser beam to expand sufficiently to increase power and exit the lasing region with a shape that is easily focused by inexpensive optical elements. The present invention is of a particular importance for diffusion-cooled, RF discharge excited gas lasers where the use of a relatively low (40.68 MHz) ISM excitation frequency allows for varying the interelectrode distance without causing destructive RF discharge non-uniformities.

Figure 5:
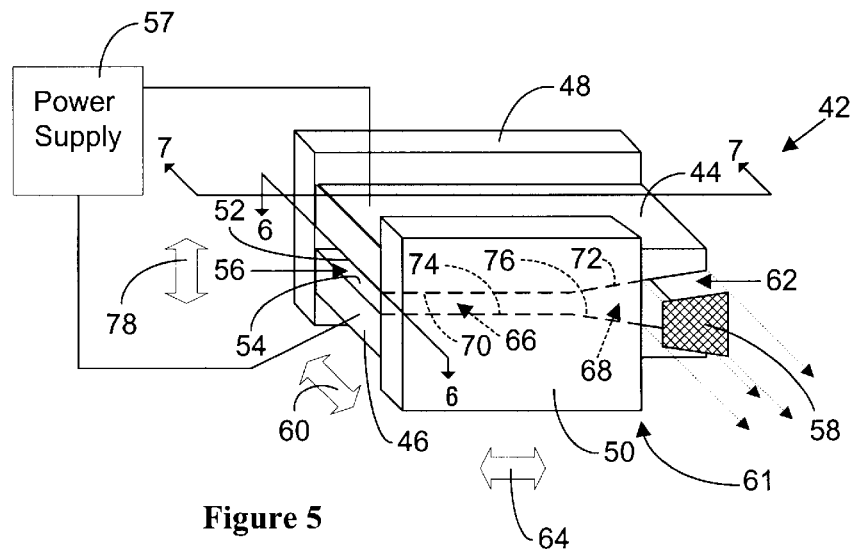
FIG. 5 is an isometric schematic illustration of a variable-aperture laser having a narrow-aperture section and a free-space section according to the present invention.

A variable-aperture laser 42 structured according to the present invention is shown in FIG. 5. The variable-aperture laser 42 includes first and second spaced-apart elongated slab electrodes 44, 46 extending between first and second resonator mirrors 48, 50. The slab electrodes 44, 46 can be made of all metal or can be coated with a dielectric material. The first and second electrodes include interior resonator walls 52, 54, respectively, which, together with the resonator mirrors 48, 50, define a lasing region 56 therebetween that contains a gas lasing medium, such as a mixture of carbon dioxide ($CO_2$), nitrogen ($N_2$), helium (He), and Xenon (Xe). Preferably, an RF voltage is applied by a power supply 57 to the gas lasing medium via the slab electrodes 44, 46, which cause the lasing medium to emit laser energy. Alternatively, the voltage across the electrodes 44, 46 can be microwave, pulsed, direct-current, or any other voltage that stimulates the lasing medium into producing laser energy. Preferably, the resonator mirrors 48, 50 form the laser energy into a laser beam 58 traveling back and forth in a lateral direction 60 within the lasing region 56 between the resonator mirrors. The resonator mirrors 48, 50 form an unstable resonator with an exit aperture 62 such that the laser beam 58 travels in a longitudinal direction 64, transverse to the lateral direction 60, until the laser beam exits the lasing region 56 via the exit aperture 62. The exit aperture 62 is formed by extending the first resonator mirror 48 beyond the second resonator mirror 50 in the longitudinal direction 64 such that the laser beam 58 is reflected by the first resonator mirror 48 past the end of the second resonator mirror 50 and out of the lasing region 56 via the exit aperture 62. The resonator mirrors 48, 50 can form a resonator of either confocal or non-confocal type.

Figure 1:
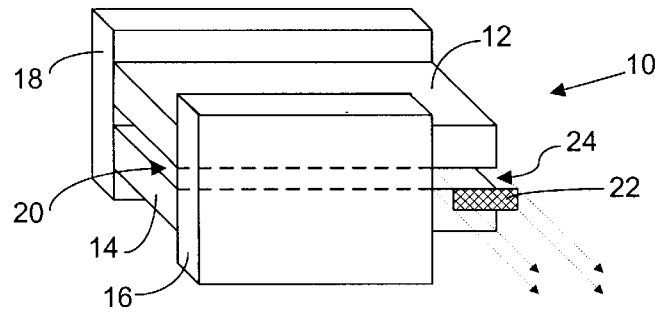
FIG. 1 is an isometric schematic illustration of a prior art variable-aperture laser not drawn to scale.

Unlike the prior art laser shown in FIG. 1, the resonator walls 52, 54 of the variable-aperture laser shown in FIG. 5 are structured to define two sections in the lasing region 56: a narrow-aperture section 66 and a free-space section 68. The resonator wall 52 defined by the first slab electrode 44 includes a planar, narrow-aperture wall portion 70 and a planar free-space wall portion 72 that define an upper surface of the lasing region 56. Similarly, the resonator wall 54 defined by the second slab electrode 46 includes a planar, narrow-aperture wall portion 74 and a planar free-space wall portion 76 that define a lower surface of the lasing region 56. The narrow-aperture wall portions 70, 74 are parallel to and across from each other and together define the narrow-aperture section 66 of the lasing region 56. In one embodiment, the narrow-aperture wall portions 70, 74 are positioned sufficiently close to each other (e.g., 2–4 millimeters) to waveguide the laser beam 58 in a vertical direction 78 transverse to the lateral direction 60 and the longitudinal direction 64. The free-space wall portions 72, 76 are across from each other and together define the free-space section 68 of the lasing region 56.

Figure 2:
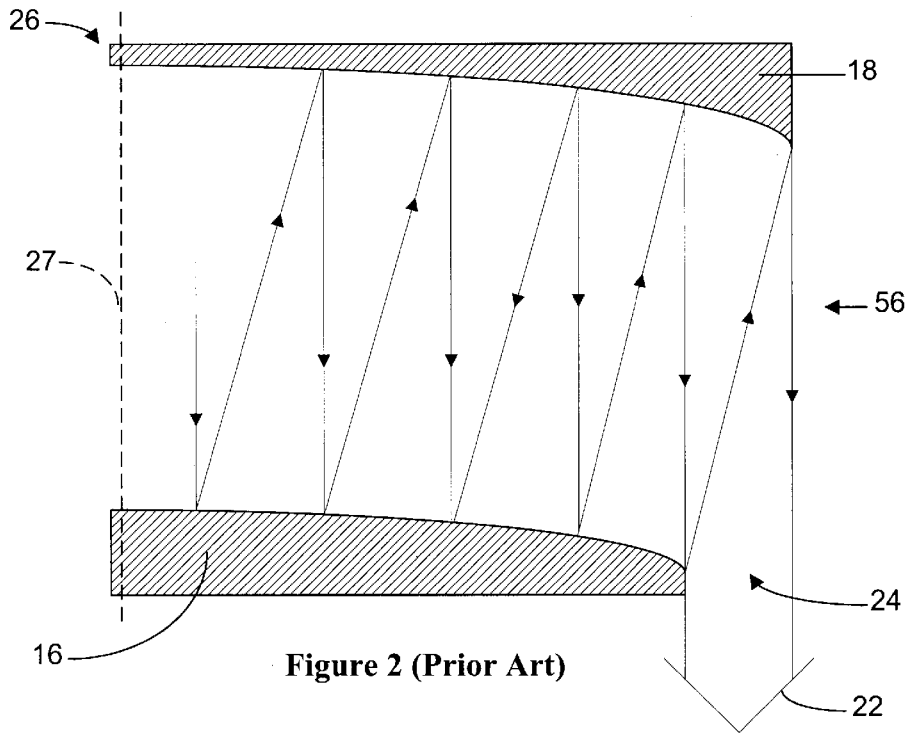
FIG. 2 is an enlarged cross-sectional view of the resonator mirrors of the variable-aperture laser of FIG. 1.
Figure 3:
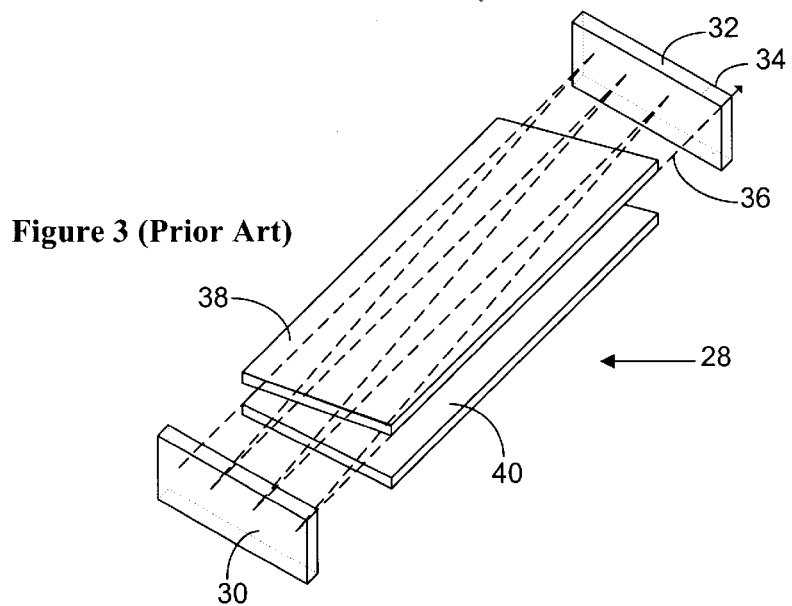
FIG. 3 is an isometric schematic illustration of an alternate prior art variable-aperture laser of having diverging waveguide electrodes.
Figure 4:
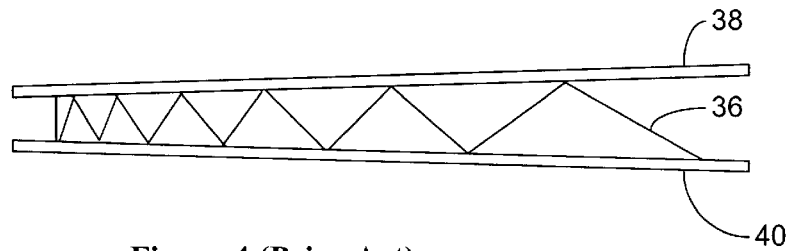
FIG. 4 is an enlarged side elevational view of the waveguide electrodes of the variable-aperture laser of FIG. 3.
Figure 6:
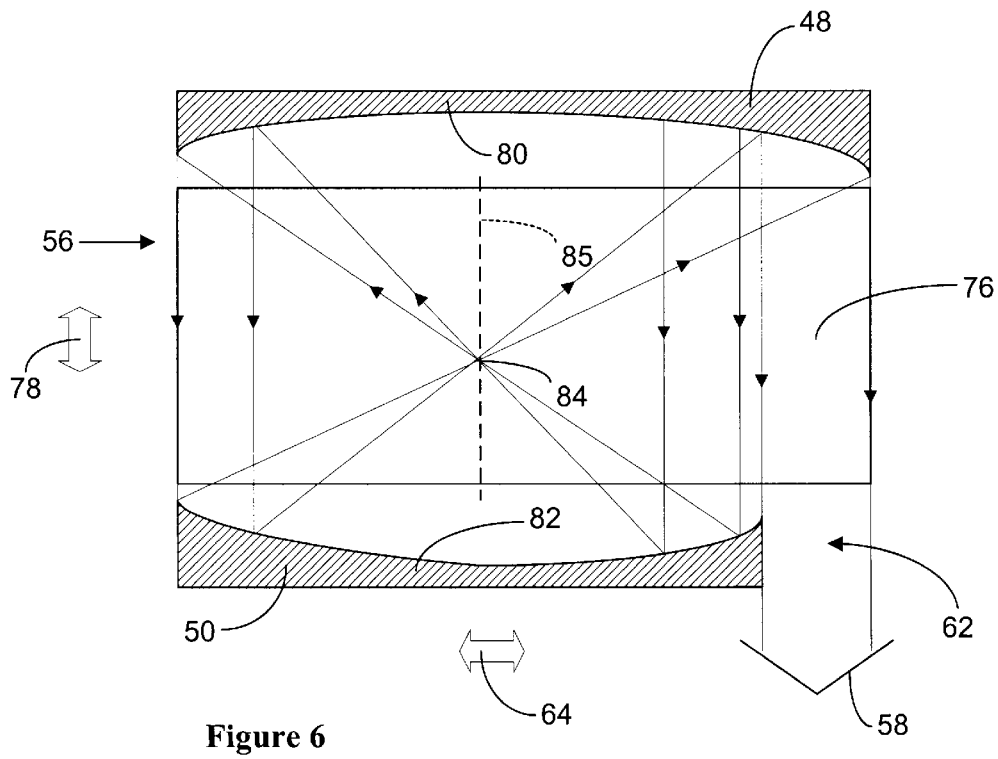
FIG. 6 is an enlarged cross-sectional view of the resonator mirrors of the variable-aperture laser of FIG. 5 taken substantially along line 6—6.

An enlarged cross-sectional view of the variable-aperture laser 42, taken along line 6—6 of FIG. 5, is shown in FIG. 6. The resonator mirrors 48, 50 form a negative-branch, confocal resonator in that they have opposing concave reflecting surfaces 80, 82, respectively, and are confocal, i.e., have a common focal point 84 on a resonator axis 85. As can be seen in FIG. 6, the exit aperture 62 is formed between the resonator walls 52; 54 by extending the first resonator mirror 48 beyond an end 86 of the second resonator mirror 50 so that the laser beam 58 is reflected by the first resonator mirror 48 out of the lasing region 56 through the exit aperture 62. Such a negative-branch, confocal resonator has been found to produce a much less misalignment-sensitive output laser beam than the positive-branch confocal resonator shown in FIG. 2, as discussed in more detail in U.S. Pat. No. 5,048,048 to Nishimae et al., which is incorporated herein by reference. However, it will be appreciated that the positive-branch confocal resonator 26 shown in FIG. 2 could be employed in the variable-aperture laser 42 of the present invention instead of the negative-branch confocal resonator shown in FIG. 6. In addition, the resonator mirrors 48, 50 can be flat if the waveguide wall portions 70, 74 of the first and second slab electrodes 44, 46 were structured to diverge slightly like the slab electrodes 38, 40 of U.S. Pat. No. 5,220,577 shown in FIGS. 3–4, while still remaining within the scope of the present invention.

Figure 7:
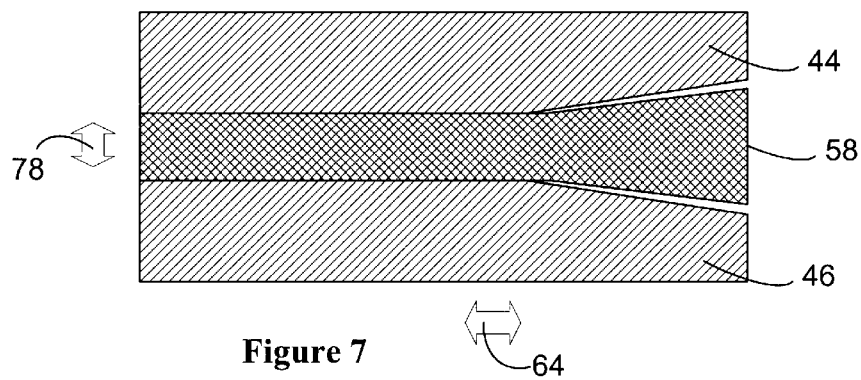
FIG. 7 is an enlarged cross-sectional view of the variable-aperture laser of FIG. 5 taken along line 7—7.

An enlarged, cross-sectional view of the variable-aperture laser 42, taken along line 7—7 of FIG. 5, is shown in FIG. 7. FIG. 7 shows the laser beam 58 being waveguided in the narrow-aperture section 66 of the lasing region 56. In addition, the laser beam 58 is allowed to expand freely in the free-space section 68 without being waveguided.

One way to ensure that the free-space wall portions 72, 76 do not act as waveguides is to have the free-space wall portions diverge at an angle that is greater than or equal to the transverse diffraction angle of the laser beam 58 propagating through the region near the focus 84 into the free-space section 68. Further, those skilled in the laser art will appreciate that there are many orientations of the free-space wall portions 72, 76 that could be implemented to create the free-space section 68 that does not waveguide the laser beam 58, and thus, provide the laser beam with free-space operation rather than waveguided operation.

Figure 8:
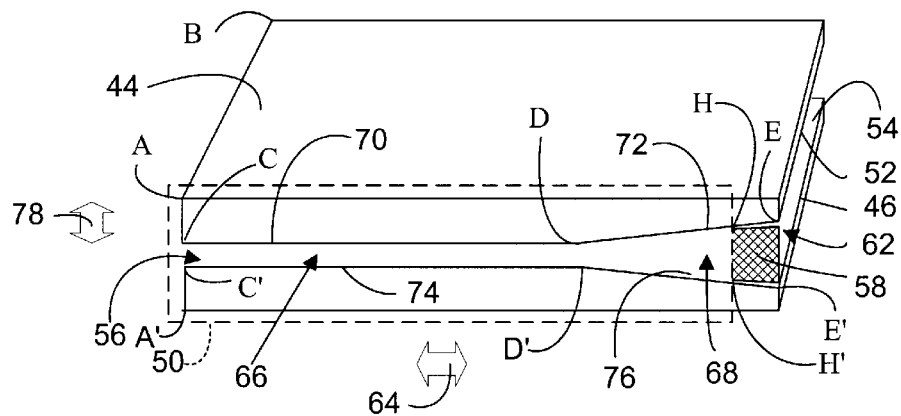
FIG. 8 is an enlarged isometric view of the variable-aperture laser of FIG. 5.

As can be seen more clearly in FIG. 8, the slab electrodes 44, 46 are structurally identical to each other and are designed such that the free-space wall portions 72, 76 diverge from each other sufficiently to enable the laser beam 58 to expand without restriction from the free-space wall portions in the free-space section 68. In the embodiment shown in FIG. 8, the length AB of each of the first and second slab electrodes 44,46 is 1 meter, the length CD of each of the waveguide wall portions 70, 74 is 53 millimeters, the length DE of each of the free-space wall portions 72, 76 is 27 millimeters, and the distance CC' between the waveguide wall portions 70, 74 is a uniform 4 millimeters. The planar free-space wall portions 72,76 diverge uniformly from the points D, D' at the meeting points of the waveguide wall portions and the free-space wall portions, to the points E, E' at opposite sides of the exit aperture 62. The distance EE' between the free-space wall portions 72, 76 defining the outward, first side of the exit aperture 62 is 6 millimeters, and the distance HH' defining an inward, second side of the exit aperture 62 is 5.8 millimeters. Each of the distances HE and H'E' defining upper, third and lower, fourth sides of the exit aperture 62 is 6 millimeters. Of course, such dimensions are exemplary only and could changed in a known manner by those skilled in the laser art without changing the scope of the invention.

It will be appreciated that the free-space wall portions 72, 76 can be angled with respect to the waveguide wall portions 70, 74 at angles greater than the transverse diffraction angle of the laser beam in order to ensure that the free-space section 68 does not waveguide the laser beam 58. However, to maximize the power of the laser beam 58 without limiting the expansion of the laser beam, the free-space wall portions 72, 76 should diverge from the waveguide wall portions 70, 74 at angles close to the transverse diffraction angle.

Alternatively, the free-space wall portions 72, 76 could be made parallel to each other if the distance between the free-space wall portions were made greater than or equal to the width of the laser beam 58 at its point of greatest expansion. Further, those skilled in the laser art will appreciate that there are many orientations of the free-space wall portions 72, 76 that could be implemented to create the free-space section 68 that does not waveguide the laser beam 58, and thus, provides the laser beam with free-space operation rather than waveguided operation.

For several reasons, the variable-aperture laser 42 of the present invention shown in FIGS. 5–7 is much superior to the prior art laser 10 shown in FIG. 1. First, the laser beam 58 produced by the variable-aperture laser 42 of the present invention has a shape that can be focused easily by inexpensive optical elements. The shape of the laser beam 22 of the prior art slab laser 10 shown in FIG. 1 is rectangular with a high aspect ratio that require expensive cylindrical telescopes to transform the beam into a more square-shaped beam in order to focus it. In contrast, the laser beam 58 produced by the variable-aperture laser 42 shown in FIGS. 5–7 is nearly square-shaped, which is focused easily by conventional, inexpensive spherical lenses.

Second, the relatively wide exit aperture 62 of the variable-aperture laser 42 of the present invention compared to the exit aperture 24 of the prior art slab laser 10 shown in FIG. 1 causes the laser beam 58 to have a much lower optical flux than that of the prior art laser beam 22. Such a low flux laser beam 58 is more easily handled by inexpensive optical elements than the prior art laser beam 22.

Third, the increased gap of the exit aperture 62 enables the variable-aperture laser 42 to be excited with a lower frequency ISM frequency (e.g., 40.68 MHz). As is known in the art, the optimum frequency of excitation varies inversely with the exit aperture gap as explained in the Vitruk et al. paper discussed herein. The lower ISM frequency enables standard, inexpensive laser drivers to be employed and ensures that the laser satisfies EMI compliance regulations.

Fourth, the relatively low ISM range excitation frequency enables a varying interelectrode distance without causing destructive RF discharge non-uniformities. These characteristics of 40 MHz RF gas discharges according to the present invention were confirmed in plasma experiments with a laser employing a 4 mm interelectrode gap in the narrow-aperture section and diverging gap up to 10 mm in the free-space section. The experiments employed a typical $CO_2$ laser gas mixture with a 20–50 Torr gas pressure range under typical slab laser power loading conditions of 2–5 W per $cm^2$ of discharge area. Thus, the low excitation frequencies allow for as large as approximately 10 mm by 10 mm output aperture of the laser beam which is comparable to those of high power, fast-flow $CO_2$ gas lasers.

Figure 9:
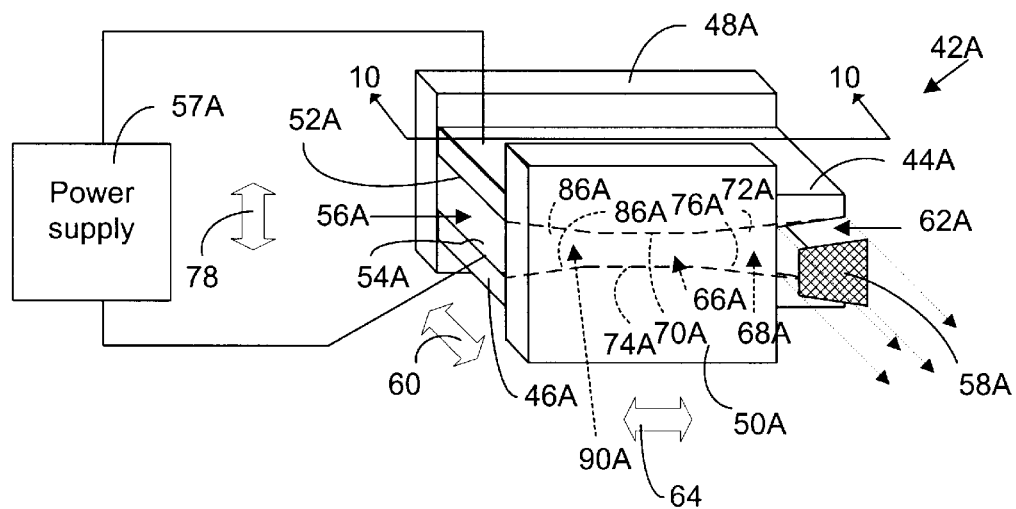
FIG. 9 is an isometric view of a first alternate embodiment of a variable-aperture laser have two free-space sections and a narrow-aperture section according to the present invention.

In a first alternate embodiment of the invention, a variable-aperture laser 42A is shown in FIG. 9. Like the variable-aperture laser 42 shown in FIGS. 5–7, the variable-aperture laser 42A includes a lasing region 56A with a free-space section 68A formed by free-space wall portions 72A, 76A of slab electrodes 44A, 46A, respectively. In addition, the slab electrodes 44A, 46A include narrow-aperture wall portions 70A, 74A that define a narrow-aperture section 66A in the lasing region 56A. The narrow-aperture section 66A may be either of a waveguide or a free-space type. Further, the laser 42A includes the same negative-branch confocal resonator formed by resonator mirrors 48A, 50A similar to those shown in FIG. 6. However, the slab electrodes 44A, 46A also include second free-space wall portions 86A, 88A, respectively, that are spaced apart from each other sufficiently to define a second free-space section 90A of the lasing region 56A to a side of the narrow-aperture section 66A opposite the first free-space section 68A. Like the first free-space wall portions 72A, 76A, the second free-space wall portions 86A, 88A are angled with respect to the waveguide wall portions 70A, 74A. Such a lasing region 56A with two free-space sections 68A, 90A enables a laser beam 58A to expand faster than the laser beam 58 expands in the free-space section 68 of the variable-aperture laser 42 shown in FIGS. 5–7.

Figure 10:
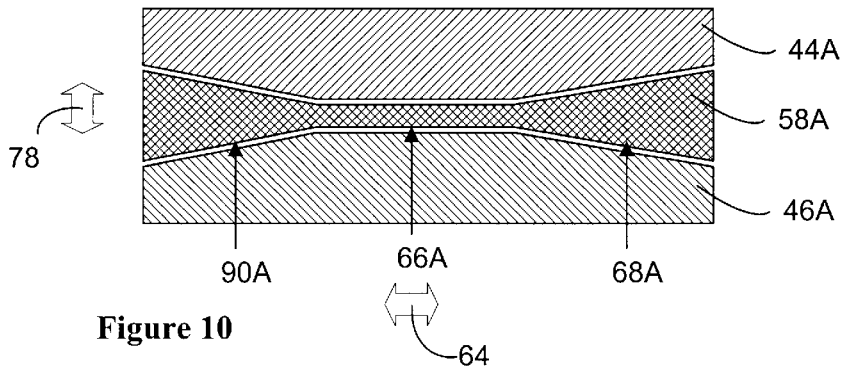
FIG. 10 is an enlarged cross-sectional view of the variable-aperture laser taken alone lines 10—10 of FIG. 9.

A cross-sectional view of the variable-aperture laser 42A, taken along line 10—10 of FIG. 9, is shown in FIG. 10. FIG. 10 shows the narrow-aperture section 66A, acting as a free-space or non-waveguide section. The gap between the resonator walls 52A, 54A is larger enough to prevent the resonator walls from waveguiding the laser beam 58A formed in the narrow-aperture section 66A. However, the gap between the resonator walls 52A, 54A in the narrow-aperture section 66A is smaller than the gap between the resonator walls in the free-space sections 68A, 90A and is small enough to provide effective excitation of the lasing medium therein.

One way to ensure that the resonator walls 72A, 76A do not act as waveguides is to have the diverging portions of the walls not obstructing the intracavity propagation of the laser beam. The divergence angle between resonator walls 72A and 76A might be chosen as $1-M^2$ (radians) where $M=R/r$ is magnification factor of the resonator, R and r are the radii of curvature of the resonator mirrors. Further, those skilled in the laser art will appreciate that there are many orientations of the free-space wall portions 72A, 76A that could be implemented to create the free-space section 68A that does not waveguide the laser beam 58A, and thus, provides the laser beam with free-space operation rather than waveguided operation.

Figure 11:
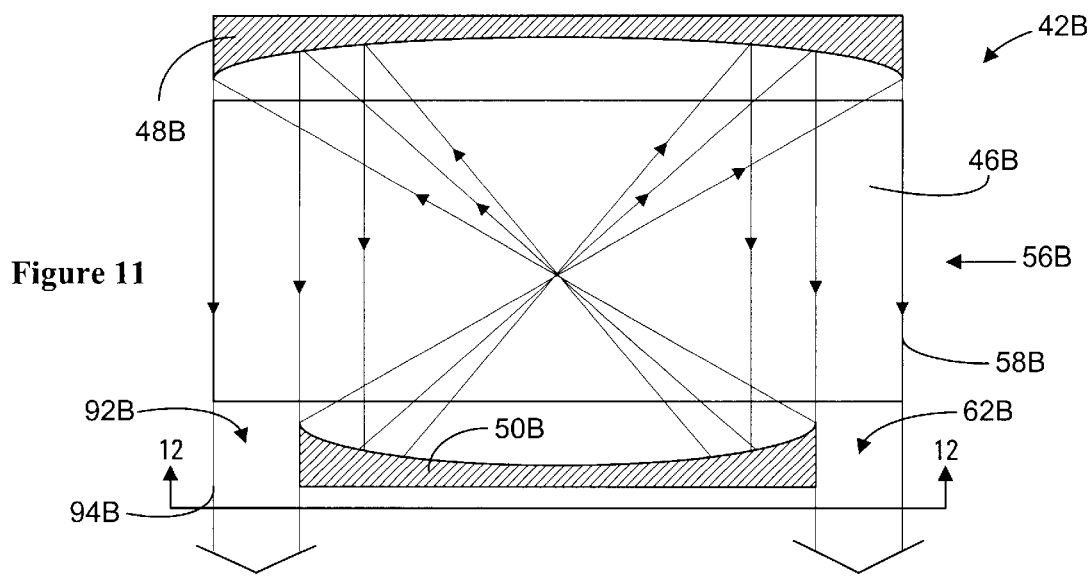
FIG. 11 is a cross-sectional view of a second alternate embodiment of a variable-aperture laser having two free-space sections and two exit apertures according to the present invention.
Figure 12:
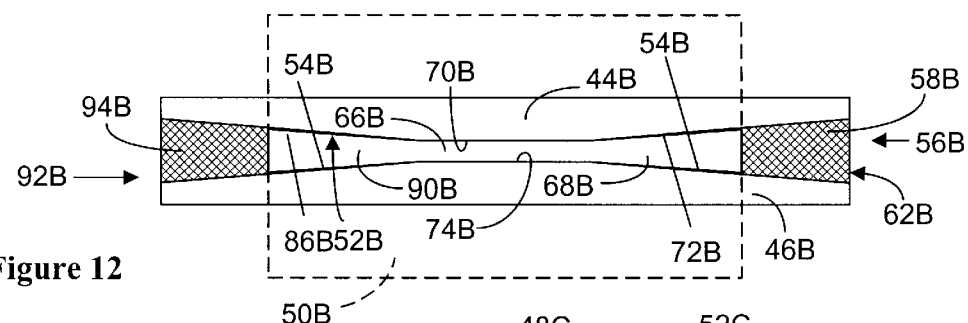
FIG. 12 is a side elevational view of the variable-aperture laser of FIG. 11 taken substantially along line 12—12.

A second alternate embodiment of the invention includes a variable-aperture laser 42B as shown in FIGS. 11 and 12. FIG. 12 is a side elevational view of the variable-aperture laser 42B taken along line 12—12 shown in FIG. 11. The variable-aperture laser 42B includes a negative-branch confocal resonator formed by resonator mirrors 48B, 50B (FIG. 11). Like the embodiment shown in FIG. 9, the variable-aperture laser 42B includes a lasing region 56B with two free-space sections 68B, 90B separated by a narrow-aperture section 66B (FIG. 12) that may be of a waveguide or free-space type. Further, the variable-aperture laser 42B forms a laser beam 58B that exits the lasing region 56B via an exit aperture 62B. Unlike the embodiment shown in FIG. 9, however, the variable-aperture laser 42B includes a second exit aperture 92B that enables a second laser beam 94B to exit the lasing region 56B. Like the first exit aperture 62B, the second exit aperture 92B is formed by extending the first resonator mirror 48B beyond an opposite end of the second resonator mirror 50B, such that the first resonator mirror 48B reflects the second laser beam 94B out of the exit aperture 92B.

Figure 13:
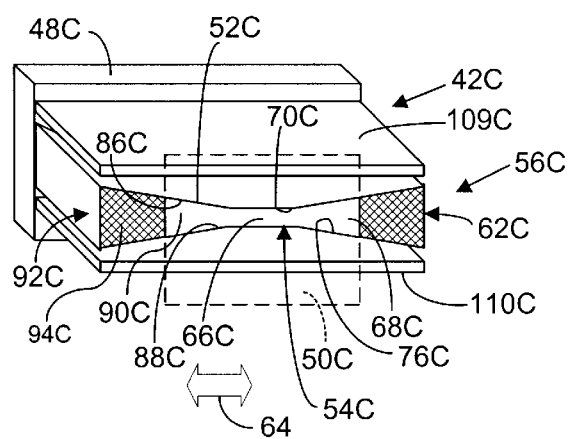
FIG. 13 is an isometric view of a third alternate embodiment of a laser having a solid lasing medium and two free-space sections according to the present invention.

A third alternate embodiment of the invention includes a solid-state laser 42C as shown in FIG. 13. The primary difference between the laser 42B shown in FIGS. 11 and 12 and the laser 42C shown in FIG. 13 is that the laser 42C includes a solid-state lasing region 56C rather than a gas-filled lasing region as used in the laser 42B. The solid-state lasing region 56C can be made from any of numerous known solid lasing materials, but is illustrated as neodymium ions in an yttrium-aluminum-garnet lattice (Nd:YAG). Like the gas lasing region 56B, the solid-state lasing region 56C includes two free-space sections 68C, 90C separated by a narrow-aperture section 66C. To excite the Nd:YAG lasing medium, the laser 42C shown in FIG. 12 employs a first and second flashlamps (or laser diode arrays) 109C, 110C to optically pump the lasing medium.

The laser 42C includes first and second resonator walls 52C, 54C formed by opposite walls of the solid-state lasing region 56C. Like the resonator walls 52B, 54B of the embodiment shown in FIG. 12, the first and second resonator walls 52C, 54C each include a narrow-aperture wall portion 70C, 74C and first (72C, 76C) and second (86C, 88C) free-space wall portions. Preferably, the narrow-aperture wall portions 70C, 74C form a narrow-aperture section 66C having a thickness between the narrow-aperture wall portions that is sufficient to waveguide the laser beam formed therein. Alternatively, the narrow-aperture section 66 can be sufficiently thick to provide free-space operation. The first free-space wall portions 72C, 76C form a first free-space section 68C having a thickness between the first free-space wall portions that is sufficient to allow the first laser beam 58C to expand freely. Similarly, the second free-space wall portions 86C, 88C form a second free-space section 90C that is sufficiently wide to allow the second laser beam 94C to expand freely. It will also be appreciated that the solid-state lasing region 56C could be shaped similar to the lasing region 56 shown in FIG. 5.

Like the laser 42B shown in FIG. 11, the laser 42C shown in FIG. 13 preferably employs a negative branch confocal resonator formed by resonator mirrors 48C, 50C to resonate the laser energy produced by the Nd:YAG lasing medium forming the solid-state lasing region 56C. The second resonator mirror 50C extends less than the full length of the first resonator mirror 48C in the longitudinal direction 64 so that first and second exit apertures 62C, 92C are formed in the free-space sections 68C, 90C of the lasing region 56C. First and second laser beams 58C, 94C formed in the lasing region 56C exit via the exit apertures 62C, 92C. Alternatively, a resonator similar to the resonator formed by resonator mirrors 48, 50 in FIG. 6 could also be employed.

Figure 14:
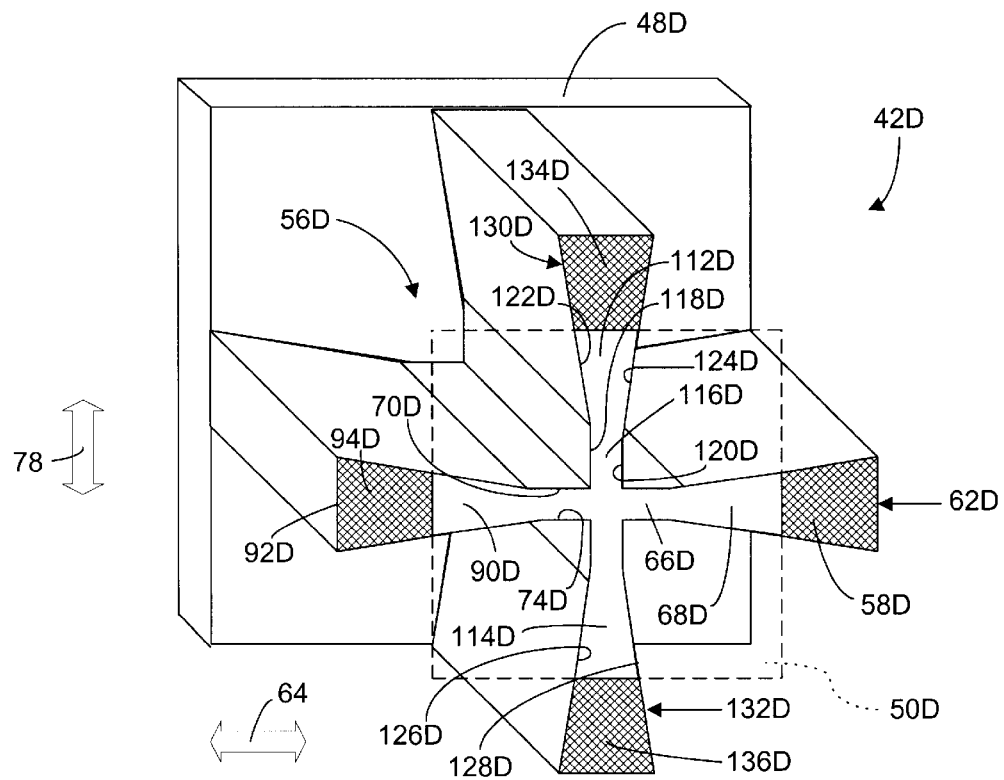
FIG. 14 is an isometric view of a fourth alternate embodiment of a laser having four free-space sections and a narrow-aperture section according to the present invention.

A fourth alternate embodiment of the invention includes a variable-aperture laser 42D as shown in FIG. 14. The laser 42C includes a solid-state lasing region 56D formed of a slab of solid-state lasing medium, such as Nd:YAG. Alternatively, gas or liquid lasing media also could be employed. Like the solid-state lasing region 56C shown in FIG. 12, the lasing region 56D includes first and second free-space sections 68D, 90D separated by a narrow-aperture section 66D. In addition, the solid-state lasing region 56D includes third and fourth free-space sections 112D, 114D separated by a second narrow-aperture section 116D that transversely intersects the first narrow-aperture section 66D. The second narrow-aperture section 116D is defined by third and fourth wall portions 118D, 120D that are each bisected by and bisect the first and second wall portions 70B, 74B. The third free-space section 112D is defined by fifth and sixth free-space wall portions 122D, 124D while the fourth free-space section 114D is defined by seventh and eighth free-space wall portions 126D, 128D. The laser 42D preferably includes a plurality of flashlamps (not shown for simplicity), similar to the flashlamps 109C, 110C shown in FIG. 13, if a solid-state or a liquid lasing medium is employed and a plurality of electrodes if a gas lasing medium is employed.

Like the laser 42B shown in FIG. 11, the laser 42D shown in FIG. 14 employs a confocal resonator formed by resonator mirrors 48D, 50D to resonate the laser energy produced by the Nd:YAG lasing medium forming the solid-state lasing region 56D. The second resonator mirror 50D extends less than the full length of the first resonator mirror 48D in the lateral direction 64 so that first and second exit apertures 62D, 92D are formed in the first and second free-space sections 68D, 90D of the lasing region 56D. First and second laser beams 58D, 94D formed in the lasing region 56D exit via the exit apertures 62D, 92D, respectively. In addition, the second resonator mirror 50D extends less than the full length of the first resonator mirror in the vertical direction 78 such that third and fourth exit apertures 130D, 132D are formed in the third and fourth free-space sections 112D, 114D, respectively, of the lasing region 56D. Third and fourth laser beams 134D, 136D formed in the lasing region 56D exit via the third and fourth exit apertures 130D, 132D, respectively.

Figure 15:
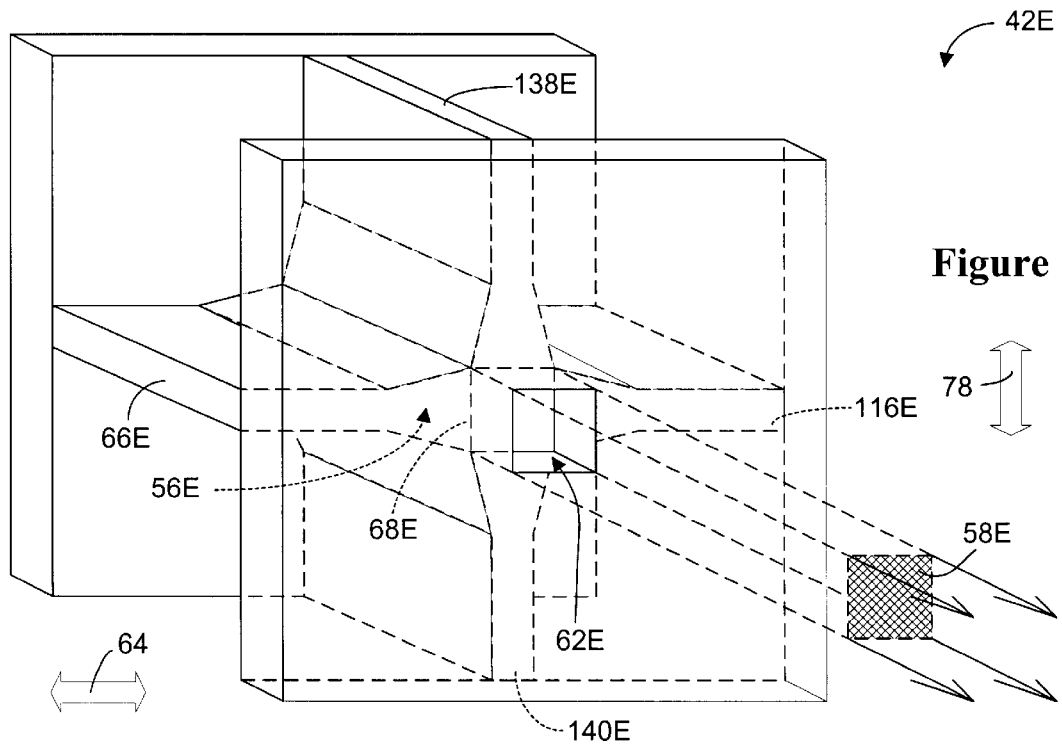
FIG. 15 is an isometric view of a fifth alternate embodiment of a laser having four narrow-aperture sections and a free-space section according to the present invention.

A fifth alternate embodiment of the invention includes a laser 42E as shown in FIG. 15. The laser 42E includes a lasing region 56E similar to the lasing region 56D except that the free-space section 68E of the lasing region 56E are positioned centrally and there is a single laser beam exit aperture 62E, through which the laser beam 58E exits the lasing region 56E. The lasing region 56E includes first through fourth narrow-aperture sections 66E, 116E, 138E, 140E separated from each other by the central free-space section 68E. The laser 42E preferably employs a non-confocal optical resonator comprising two resonator mirrors 48E, 50E. The exit aperture 62E may be a hole through the resonator mirror 50E or it may be a transparent or semi-transparent portion of the resonator mirror 50E.

It will be appreciated based on the foregoing discussion that the present invention provides a diffusion-cooled laser with a lasing region shaped to provide a high power output laser beam of a high optical quality. The narrow-aperture section of either waveguide or free-space type of the lasing region provides a narrow gap that maximizes laser power by optimizing the excitation of the lasing medium and intensifying it by closely spaced resonator walls acting as heat exchangers. The free-space section enables the laser beam to expand sufficiently to exit through the exit aperture of the lasing region with a shape that is easily focused by inexpensive optical elements without employing expensive, cylindrical beam re-shaping telescopes. Thus, the overall cost of the laser of the present invention is approximately one-half of the cost of a typical prior art waveguide slab laser.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A laser that receives excitation energy from an energy source, comprising:

a lasing region for formation of a laser beam, the lasing region including a first narrow-aperture section and a first free-space section and being defined by a pair of resonator walls spaced apart from each other in a first direction, the resonator walls each having a narrow-aperture wall portion and a free-space wall portion wherein the narrow-aperture wall portions of the resonator walls are spaced apart by a first distance to form the first narrow-aperture section and wherein the free-space wall portions of the resonator walls are spaced apart by second distance large enough to enable the laser beam to expand without restriction from the free-space wall portions to form the first free-space section, the free-space section being spaced apart from the narrow-aperture section in a second direction generally transverse to the first direction, the lasing region having an exit aperture in the first free-space section at which the laser beam exits the lasing region in a third direction generally transverse to then first and second directions;

a lasing medium positioned within the lasing region, the lasing medium forming laser energy when excited by excitation energy from the energy source; and a pair of resonator mirror surfaces located at; opposite ends of the lasing region, the resonator mirror surfaces being configured to form the laser energy into the laser beam which extends between the resonator mirrors in the third direction, the resonator mirror surfaces being configured to reflect the laser beam back and forth in a manner that allows the laser beam to propagate in the second direction from the first narrow-aperture section to the first free-space section and out of the exit aperture in the third direction, wherein the exit aperture is defined by the free-space wall portions and one of the resonator mirrors thereby enabling the laser beam to exit through the exit aperture with an increased mode volume and decreased waveguiding.

2. The laser of claim 1 where the first distance between the narrow-aperture wall portions is small enough to enable the narrow-aperture wall portions to waveguide the laser beam.

3. The laser of claim 1 wherein the lasing medium is a solid-state lasing medium.

4. The laser of claim 3 wherein the resonator walls are formed by opposite walls of the solid-state lasing medium and the solid-state lasing medium has a first thickness at the first narrow-aperture section that enables the resonator walls to waveguide the laser beam and a larger second thickness at the free-space section that enables the laser beam to expand freely in the first direction within the free-space section.

5. The laser of claim 1 wherein the lasing medium is a gas lasing medium and the resonator walls are electrodes through which the excitation energy is delivered to the lasing medium from the excitation energy source.

6. The laser of claim 1 wherein the first free-space section is divided into at least two free-space subsections with the first narrow-aperture section therebetween, the resonator walls in each free-space subsection being spaced apart sufficiently to enable the laser beam to expand without restriction from the resonator walls in the free-space subsections.

7. The laser of claim 1 wherein the first narrow-aperture section is divided into at least two narrow-aperture subsections with the first free-space section therebetween.

8. The laser of claim 1 wherein the narrow-aperture wall portions are planar and parallel to each other and the free-space wall portions diverge from each other in the third direction.

9. A laser that receives excitation energy from an energy source, comprising:

a lasing region for formation of a laser beam, the lasing region including a first narrow-aperture section and a first free-space section and being defined by a pair of resonator walls spaced apart from each other in a first direction, the resonator walls each having a narrow-aperture wall portion and a free-space wall portion wherein the narrow-aperture wall portions of aperture wall portion and a free-space wall portion wherein the narrow-aperture wall portions of the resonator walls are spaced apart by a first distance to firm the first narrow-aperture section and wherein the free-space wall portions of the resonator walls are spaced apart by second distance large enough to enable the laser beam to expand without restriction from the free-space wall portions to form the first free-space section, the lasing region having an exit aperture in the first free-space section at which the laser beam exits the lasing region;

a lasing medium positioned within the lasing region, the lasing medium forming laser energy when excited by excitation energy from the energy source; and a pair of resonator mirror surfaces located at opposite ends of the lasing regions, the resonator mirror surfaces being configured to form the laser energy into the laser beam which extends between the resonator mirrors in a second direction generally transverse to the first direction, the resonator mirror surfaces being configured to reflect the laser beam back and forth in a manner that allows the laser beam to propagate in a third direction from the first narrow-aperture section to the first free-space section and out of the exit aperture, the third direction being generally transverse to the first and second directions, wherein the resonator mirror surfaces are confocal with respect to each other and are positioned to form an unstable resonator, wherein the exit aperture is defined by the free-space wall portions and one of the resonator mirrors, thereby enabling the laser beam to exit through the exit aperture with a width in the first direction that is larger than the first distance between the narrow-aperture wall portions.

10. The laser of claim 9 wherein each of the resonator mirror surfaces is concave, the resonator mirror surfaces thereby forming a negative branch, confocal, unstable resonator.

11. A laser that receives excitation energy from an energy source, comprising:

a lasing region for formation of a laser beam, the lasing region including a first narrow-aperture section and a first free-space section and being defined by a pair of resonator walls spaced apart from each other in a first direction, the resonator walls each having a narrow-aperture wall portion and a free-space wall portion wherein the narrow-aperture wall portions of the resonator walls arc spaced apart by a first distance to form the first narrow-aperture section and wherein the free-space wall portions of the resonator walls are spaced apart by second distance large enough to enable the laser beam to expand without restriction from the free-space wall portions to form the first free-space section, the lasing region having an exit aperture in the first free-space section at which the laser beam exits the lasing region, wherein the first free-space section is divided into at least two free-space subsections with the first narrow-aperture section therebetween, the resonator walls in each free-space subsection being spaced apart sufficiently to enable the laser beam to expand without restriction from the resonator walls in the free-space subsections;

a lasing medium positioned within the lasing region, the lasing medium forming laser energy when excited by excitation energy from the energy source; and a pair of resonator mirror surfaces located at opposite ends of the lasing regions, the resonator mirror surfaces being configured to form the laser energy into the laser beam which extends between the resonator mirrors in a second direction generally transverse to the first direction, the resonator mirror surfaces being configured to reflect the laser beam back and forth in a manner that allows the laser beam to propagate in a third direction from the first narrow-aperture section to the first free-space section and out of the exit aperture, the third direction being generally transverse to the first and second directions;

wherein each free-space subsection has a subsection exit aperture and the laser beam has at least two laser beam parts formed in the lasing region with each exiting the lasing region at a different one of the subsection exit apertures, wherein each subsection exit aperture is defined by the free-space wall portions and one of the resonator mirrors, thereby enabling the laser beam parts to exit through the respective subsection exit apertures with a width in the first direction that is larger than the first distance between the narrow-aperture wall portions.

12. The laser of claim 11, further including:
a second narrow-aperture section that intersects the first narrow-aperture section, the second narrow-aperture section being defined by narrow-aperture wall portions that extend from at least one of the narrow-aperture wall portions defining the first narrow-aperture section; and
a second free-space section separated from the free-space subsections by the first and second narrow-aperture sections, the second free-space section having two free-space subsections separated from each other by the second narrow-aperture section and the free-space subsections each including an exit aperture such that at least four laser beams are output via the exit apertures.

13. A laser that receives excitation energy from an energy source, comprising:
a lasing region for formation of a laser beam, the lasing region including a first narrow-aperture section and a first free-space section and being defined by a pair of resonator walls spaced apart from each other in a first direction, the resonator walls each having a narrow-aperture wall portion and a free-space wall portion wherein the narrow-aperture wall portions of the resonator walls are spaced apart by a first distance to form the first narrow-aperture section and wherein the free-space wall portions of the resonator walls are spaced apart by second distance large enough to enable the laser beam to expand without restriction from the free-space wall portions to form the first free-space section, the lasing region having an exit aperture in the first free-space section at which the laser beam exits the lasing region;
a lasing medium positioned within the lasing region, the lasing medium forming laser energy when excited by excitation energy from the energy source; and
a pair of resonator mirror surfaces located at opposite ends of the lasing region, the resonator mirror surfaces being configured to form the laser energy into the laser beam which extends between the resonator mirrors in a second direction generally transverse to the first direction, the resonator mirror surfaces being configured to reflect the laser beam back and forth in a manner that allows the laser beam to propagate in a third direction from the first narrow-aperture section to the first free-space section and out of the exit aperture, the third direction being generally transverse to the first and second directions, wherein the exit aperture is defined by the free-space wall portions and one of the resonator mirrors, thereby enabling the laser beam to exit through the exit aperture with a width in the first direction that is larger than the first distance between the narrow-aperture wall portions;
wherein the lasing medium is either liquid or solid-state, the energy source is an optical pumping system, and the resonator walls are opposite surfaces of the lasing medium.

14. A laser that receives excitation energy from an energy source, comprising:
a lasing medium that forms laser energy when excited by the excitation energy from the energy source;
a pair of resonator mirror surfaces facing each other and positioned on opposite ends of the lasing medium, the resonator mirror surfaces being configured to form the laser energy into a laser beam that extends between the resonator mirrors; and
a pair of resonator walls extending between the pair of resonator mirror surfaces and positioned on opposite sides of the lasing medium, each resonator wall including a narrow-aperture wall portion and a free-spare wall portion, the narrow-aperture wall portions being separated from each other by a first distance, the free-space wall portions being separated by a second distance larger than the first distance and large enough such that the laser beam expands without restriction from the free-space wall portions, the resonator walls and the resonator mirror surfaces in combination forming a lasing region having a narrow-aperture section between the narrow-aperture wall portions and a free-space section between the free-space wall portions, wherein an exit aperture is located between the free-space wall portions for exit of the laser beam from the free-space section of the lasing region through the exit aperture, wherein the resonator mirrors are separated from each other in a direction that is generally transverse to a direction in which the free-space section is located with respect to the narrow-aperture section, wherein the exit-aperture is defined by the free-space wall portions and one of the resonator mirrors, thereby enabling the laser beam to exit through the exit aperture with a width in the first direction that is larger than the first distance between the narrow-aperture wall portions.

15. The laser of claim 14 wherein the lasing medium is a solid-state lasing medium.

16. The laser of claim 15 wherein the resonator walls are formed by opposite walls of the solid lasing medium and the solid lasing medium has a first thickness at the waveguide wall portions that enables the resonator walls to waveguide the laser beam and a larger second thickness at the free-space wall portions that enables the laser beam to expand without restriction from the free-space wall portions.

17. The laser of claim 14 wherein the resonator mirror surfaces are confocal with respect to each other and are positioned to form an unstable resonator.

18. The laser of claim 17 wherein each of the resonator mirror surfaces is concave, the resonator mirror surfaces thereby forming a negative branch, confocal, unstable resonator.

19. The laser of claim 14 wherein the lasing medium is a gas and the resonator walls are electrodes through which the excitation energy is delivered to the lasing medium from the excitation energy source.

20. The laser of claim 14 wherein each resonator wall includes plural free-space wall portions separated by the narrow-aperture wall portion of the resonator wall, each free-space wall portion being spaced apart from a corresponding free-space wall portion of the other resonator wall sufficiently to enable the laser beam to expand without restriction from the free-space wall portions.

21. The laser of claim 20 wherein each free-space wall portion defines a free-space exit aperture with the corresponding free-space wall portion in the other resonator wall and the laser beam has at least two laser beam parts formed in the lasing region, with each exiting the lasing region at a different one of the free-space exit apertures.

22. The laser of claim 14 wherein the narrow-aperture wall portions are planar and parallel to each other and the free-space wall portions diverge from each other in the third direction.

23. The laser of claim 14 wherein the first distance separating the narrow-aperture wall portions from each other is sufficiently small to enable the narrow-aperture wall portions to waveguide the laser beam.

24. A laser that receives excitation energy from an energy source, comprising:

a lasing medium that forms laser energy when excited by the excitation energy from the energy source;

a pair of resonator mirror surfaces facing each other and positioned on opposite ends of the lasing medium, the resonator mirror surfaces being configured to form the laser energy into a laser beam that extends between the resonator mirrors; and a pair of resonator walls extending between the pair of resonator mirror surfaces and positioned on opposite sides of the lasing medium, each resonator wall including a waveguide wall portion and a free-space wall portion, the waveguide wall portions being separated from each other by a first distance sized to waveguide the laser beam, the free-space wall portions diverging from each other at an angle that is greater than or equal to a diffraction angle of the laser beam in free space, such that the laser beam expands without restriction from the free-space wall portions, the resonator walls and the resonator mirror surfaces form in combination a lasing region having a narrow-aperture section between the narrow-aperture wall portions and a free-space section between the free-space wall portions, wherein an exit aperture is defined by the free-space wall portions for exit of the laser beam from the free-space section of the lasing region through the exit aperture, wherein the resonator mirrors are separated from each other in a direction that is generally transverse to a direction in which the free-space section is located with respect to the narrow-aperture section, wherein the exit aperture is defined by the free-space wall portions and one of the resonator mirrors, thereby enabling the laser beam to exit through the exit aperture with a width in the first direction that is larger than the first distance between the narrow-aperture wall portions.

25. The laser of claim 24 wherein the lasing medium is a solid lasing medium, the resonator walls are formed by opposite walls of the solid lasing medium, and the solid lasing medium has a first thickness at the waveguide wall portions that enables the resonator walls to waveguide the laser beam and a larger second thickness at the free-space wall portions that enables the laser beam to expand without restriction from the free-space wall portions.

26. The laser of claim 24 wherein each of the resonator mirror surfaces is concave and confocal with respect to each other, the resonator mirror surfaces thereby forming a negative branch, confocal, unstable resonator.

27. The laser of claim 24 wherein the lasing medium is a fluid and the resonator walls are electrodes through which the excitation energy is delivered to the lasing medium from the excitation energy source.

28. The laser of claim 24 wherein each resonator wall includes plural free-space wall portions separated by the waveguide wall portion of the resonator wall, each free-space wall portion diverging from a corresponding free-space wall portion of the other resonator wall at an angle sufficient to enable the laser beam to expand without restriction from the free-space wall portions.

29. The laser of claim 28 wherein each free-space wall portion defines a free-space exit aperture with the corresponding free-space wall portion in the other resonator wall and the laser beam has at least two laser beam parts formed in the lasing region, with each exiting the lasing region at a different one of the free-space exit apertures.

* * * * *